Aug. 5, 1947.   H. A. MULVANY   2,425,115
ELECTRIC SOLDERING MACHINE
Filed Aug. 6, 1943   4 Sheets-Sheet 3
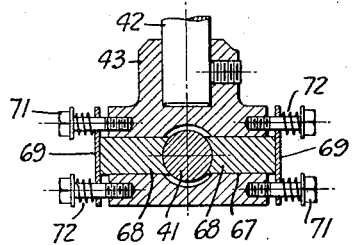
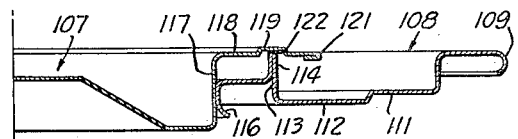
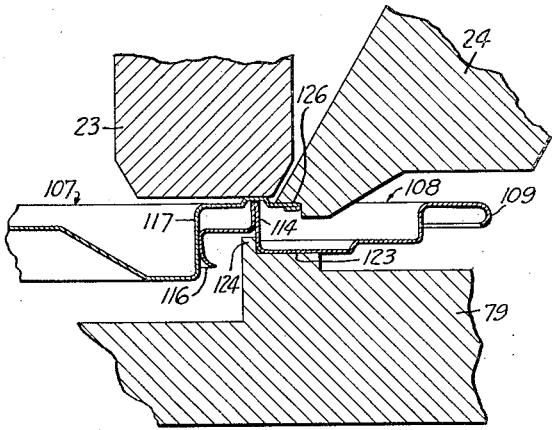
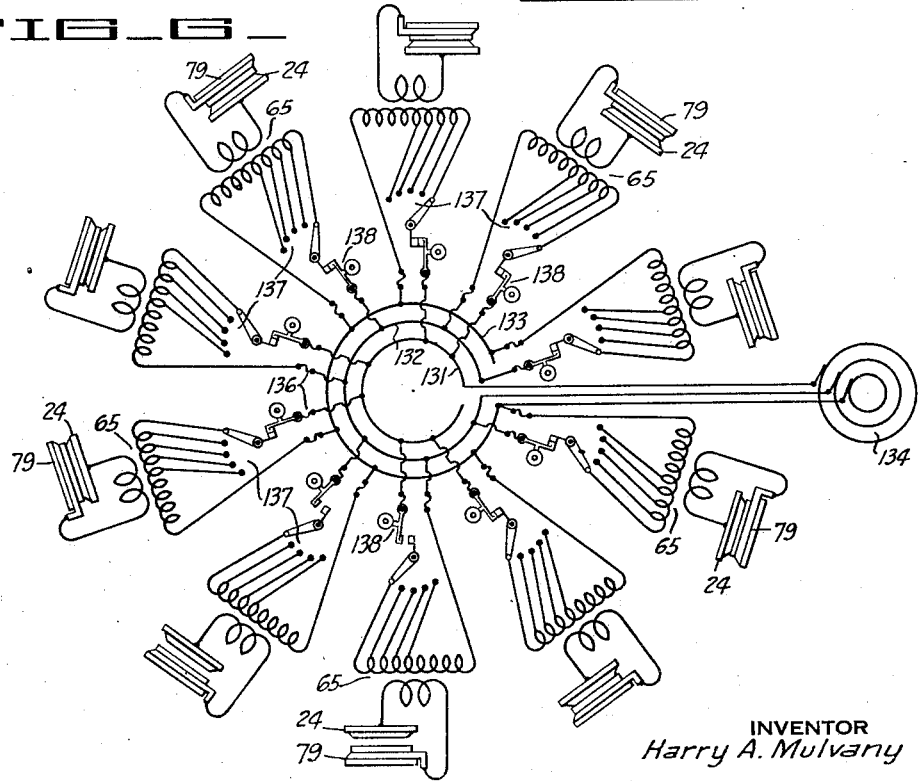
INVENTOR
Harry A. Mulvany
BY
Paul O. Fehr
ATTORNEY Aug. 5, 1947.   H. A. MULVANY   2,425,115
ELECTRIC SOLDERING MACHINE
Filed Aug. 6, 1943   4 Sheets-Sheet 4
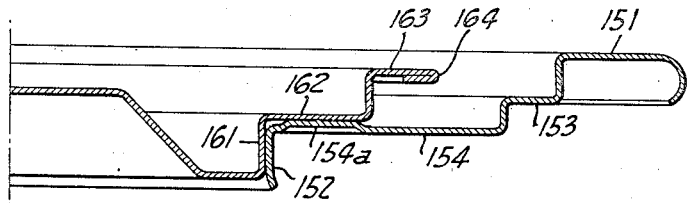
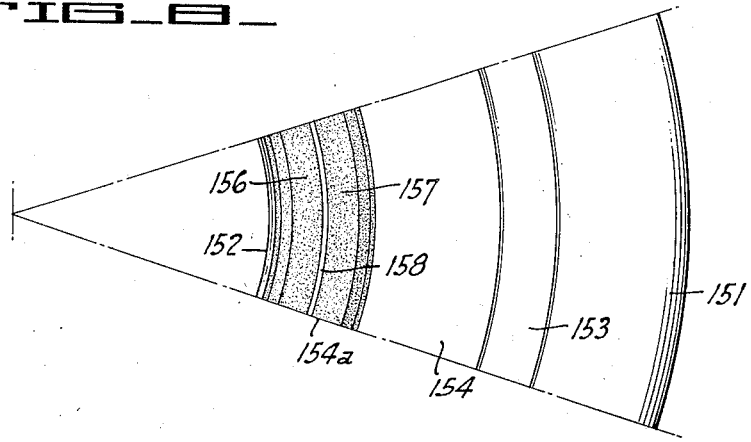
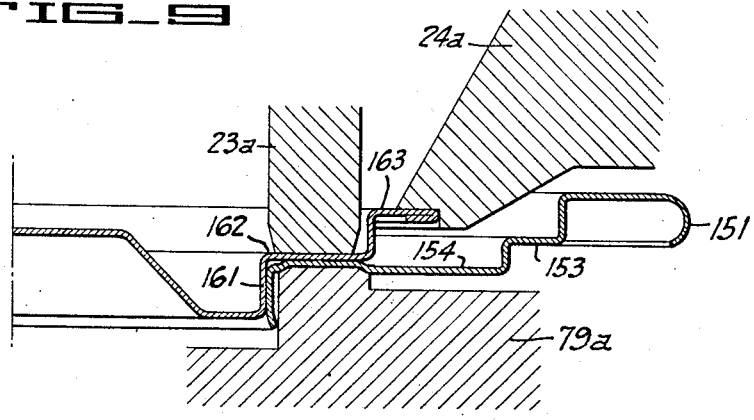
INVENTOR
Harry A. Mulvany
BY
ATTORNEY Patented Aug. 5, 1947

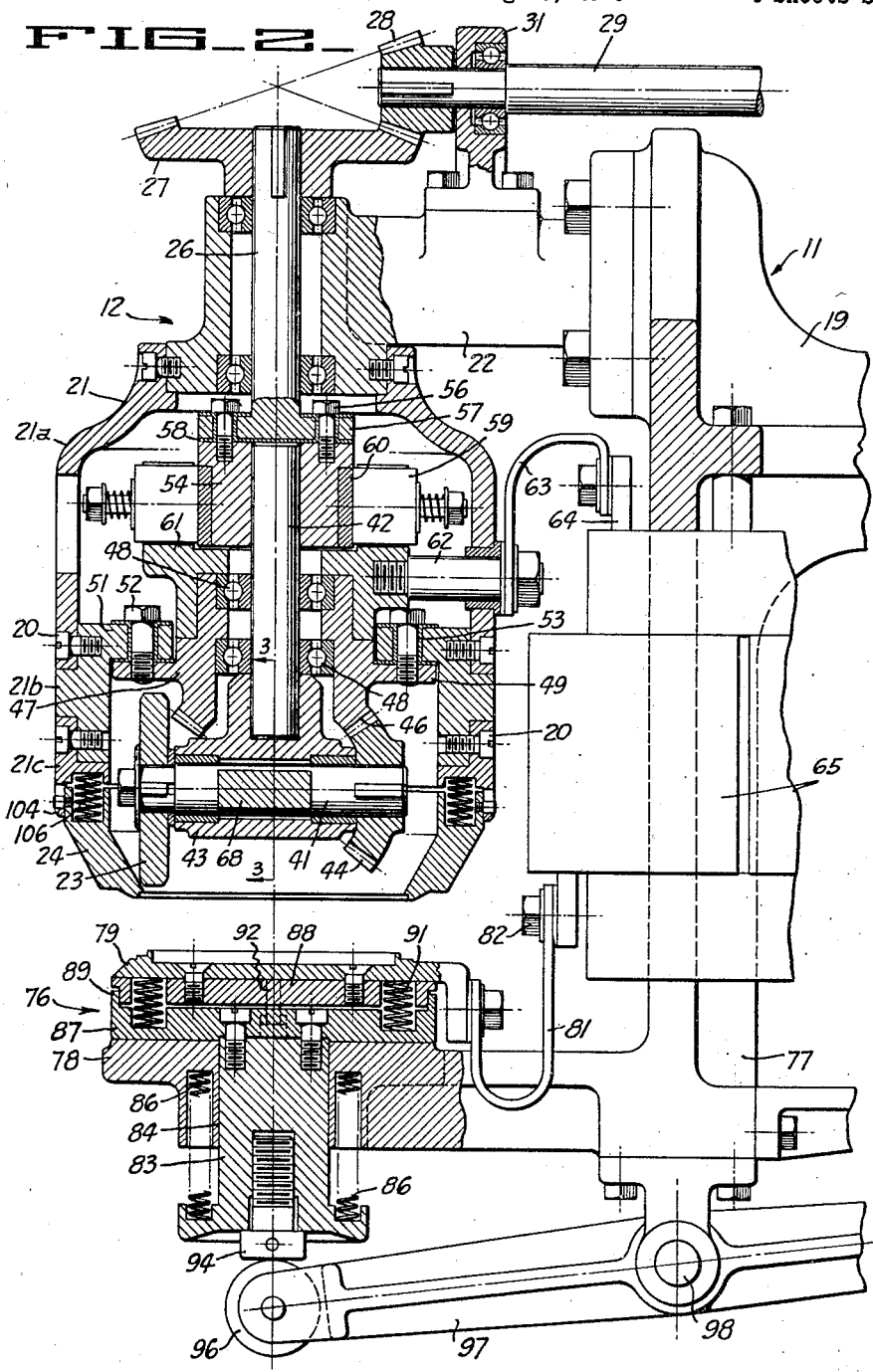

2,425,115

UNITED STATES PATENT OFFICE 2,425,115

ELECTRIC SOLDERING MACHINE

Harry A. Mulvany, Berkeley, Calif., assignor to Hills Bros. Coffee, Inc., San Francisco, Calif., a corporation of California Application August 6, 1943, Serial No. 497,647

6 Claims. (Cl. 219—12)

1

This invention relates generally to a machine for performing soldering operations in the manufacture or assembling of containers. More specifically it relates to a machine for forming a container assembly of the type disclosed and claimed in co-pending application Serial No. 448,931, filed June 29, 1942.

In the aforesaid co-pending application Serial No. 448,931 there is disclosed a sealed container construction particularly adapted for the marketing of various products such as coffee, spices, various preserved foods, paints and the like. The top of the container in that instance is assembled from two sheet metal parts, one being an outer ring, and the other being a cover or closure arranged to frictionally engage the ring. These parts have limited annular areas which are sealed together by solder, but which can be readily broken apart by prying the cover with a common kitchen utensil, such as a spoon. It is an object of the present invention to provide a novel machine for carrying out the desired soldering operation between the ring and cover parts.

A further object of the invention is to provide a machine of the above character which will carry out the soldering operation without causing interfusion between the tinned surfaces in frictional engagement between the cover and ring.

Another object of the invention is to provide a machine of the above character capable of relatively high capacity, and which is adapted to fit into existing can lines of packing establishments.

Further objects of the invention will appear from the following description in which the preferred embodiment has been described in detail in conjunction with the accompanying drawing.

Referring to the drawing:

Figure 2 is a side elevational view, partly in cross-section, on an enlarged scale, showing one of the soldering heads and associated parts.

Figure 3 is a cross-sectional detail on an enlarged scale, taken along the line 3—3 of Figure 2.

Figure 4 is an enlarged cross-sectional view, illustrating the ring and cover portions of a can assembly, prior to a soldering operation.

Figure 5 is an enlarged cross-sectional detail, showing certain operating parts during the actual soldering operation upon a ring and cover assembly.

Figure 6 is a circuit diagram showing the manner in which current is applied to the machine.

Figure 7 is a sectional view like Figure 4 but showing a modified type of cover-ring assembly.

Figure 8 is a fragmentary plan view of the ring part shown in Figure 7.

Figure 9 is a view like Figure 5 but showing application of the machine to the cover-ring assembly of Figure 7.

Figure 1:
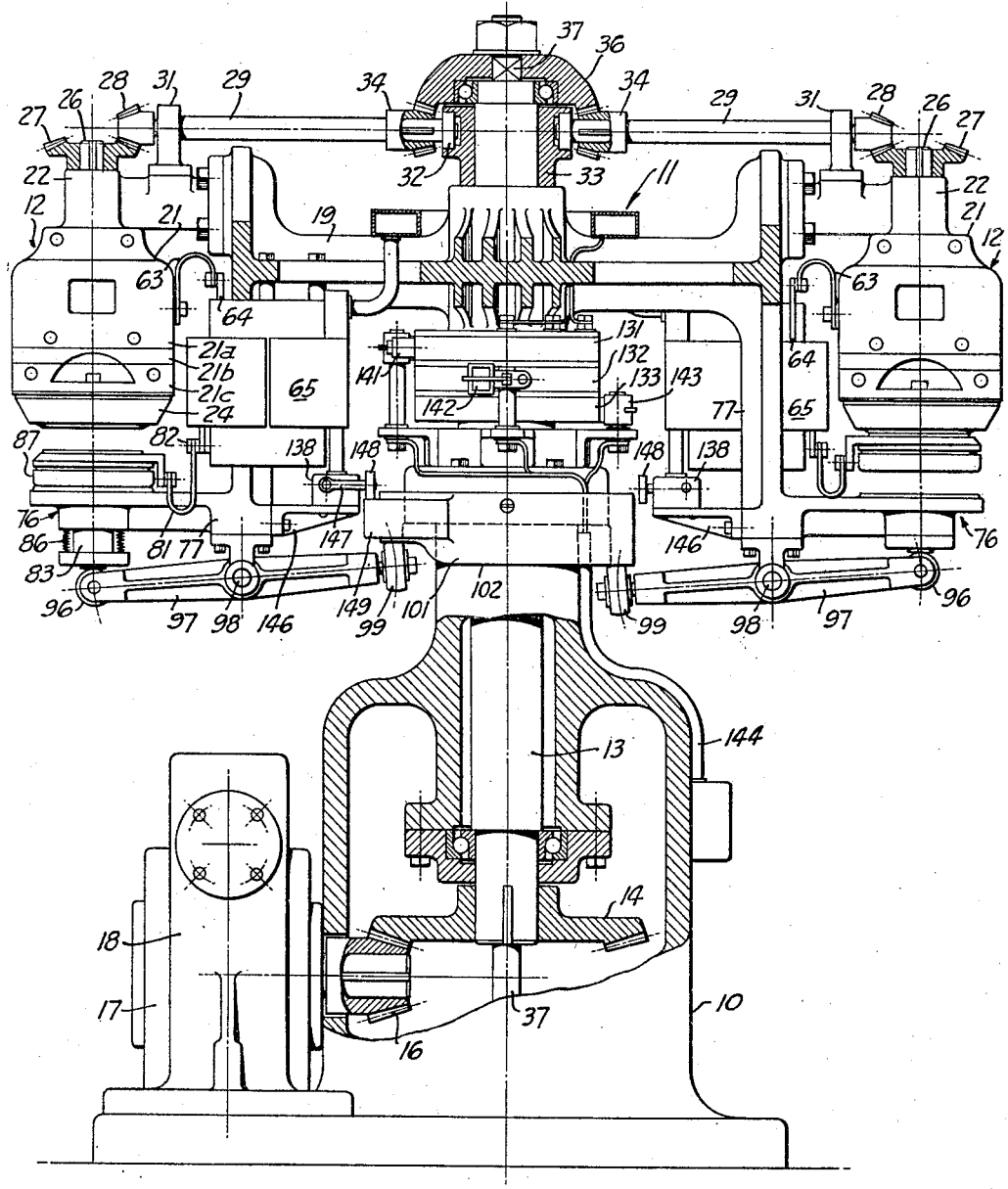
Figure 1 is a side elevational view, partly in cross-section, showing a machine incorporating the present invention.

Referring first to Figures 1 and 2 of the drawing, the machine consists generally of a base 10 which supports the operating turret 11. The turret includes a number of duplicate operating heads 12 which perform the desired soldering operation. The operating turret rotates continuously, and the assemblies to be soldered are introduced into the turret at a feed position, and are removed at a discharge position.

The central vertical axis of the machine is formed by shaft 13, which is journaled to the base 10. The drive means for this shaft consists of a bevel gear 14 which is keyed to the lower end of shaft 13. This gear is driven by pinion 16, which in turn connects to the electric motor 17 or like suitable driving means, through the speed reduction gearing 18. A spider 19 is secured to the upper portion of shaft 13 and serves as a mounting for the circumferentially spaced soldering heads 12.

In the representative construction illustrated, each of the operating heads (Figure 2) consists of a shell 21 formed of a plurality of annular sections 21a, 21b, and 21c. These sections are suitably attached together as by screws 20. The upper end of shell section 21a is attached to a bracket 22, which in turn is carried by the spider 19. Within the lower portion of the shell there is a contact wheel 23, formed of suitable material such as bronze or hard copper. The contact wheel is mounted to rotate upon its own axis and also about the central vertical axis of the soldering head. The shell also carries a lower clamping or holding ring 24. Both the contact wheel 23 and ring 24 will be presently explained in greater detail.

To apply the desired rotary motion to the contact wheel 23, a vertical shaft 26 is journaled within bracket 22, and is concentric with the central vertical axis of the soldering head. To supply continuous rotation to this shaft, suitable drive means is provided such as bevel gears 27 and 28, which are respectively secured to shaft 26 and to a radially extending shaft 29. The outer end of shaft 29 is shown carried by a journal 31, and the inner end is carried by another journal 32, which in turn is mounted upon the hub 33. Hub 33 is mounted upon and rotates together with the shaft 13. Each shaft 29 also carries a bevel gear 34 which engages a stationary bevel gear 36. The latter gear is secured to the upper end of a stationary vertical shaft 37, which extends downwardly through shaft 13, and is attached at its lower end to the base 10. It will be apparent from the foregoing that as spider 19 and the heads 12 rotate about the central vertical axis of the machine, shafts 29 are rotated about their individual axes to cause rotation of the vertical shaft 26.

The mounting for the contact wheel 23 includes a horizontal shaft 41 together with the vertical shaft 42. The latter shaft is aligned with shaft 26, and is coupled to the same as will be presently explained. Casting 43 forms a supporting journal for shaft 41, and is fixed to the lower end of the vertical shaft 42. Wheel 23 is attached to one end of shaft 41, and the other end of this shaft carries a bevel gear 44. This gear 44 meshes with gear teeth 46 formed upon the lower end of the hub 47. Shaft 42 is journaled within the hub 47, as by means of ball bearing assemblies 48, and the hub itself has an outer flange 49 which is attached to an inwardly extending flange 51 of the shell, as by means of bolts or screws 52. Suitable electrical insulation 53 is inserted between these parts in order to insulate the metal shell from the inner metal parts.

It will be apparent from the above that when shaft 42 is rotated, contact wheel 23 is moved in a circular path, and in addition engagement of gear 44 with gear teeth 46 causes the contact wheel 23 to rotate about its own horizontal axis.

In order to couple shafts 26 and 42 together, a sleeve 54 is attached to the upper end of shaft 42 and is secured as by means of screws 56 to a flange head 57 on the lower end of shaft 26. Electrical insulation 58 is also interposed between these parts, to electrically insulate shaft 26 with respect to sleeve 54 and shaft 42.

In order to connect the contact wheel 23 with one side of an electrical circuit, the sleeve 54 is fitted with a slip ring 60, formed of hardened copper, bronze, or like suitable material, and the outer surface of this ring is contacted by spring pressed carbon blocks or brushes. The brush structures 59 for this purpose can be of any conventional design, utilizing for example spring pressed conducting blocks or brushes movably carried within suitable retainers. The brush structures are shown carried by the annular hub 61, which is suitably attached to the upper portion of hub 47. A terminal post 62 is shown connected to hub 61 and extends to the exterior of shell 21 where it is connected by conductor 63 to one terminal 64 of the electrical transformer 65.

Means similar to brush structures 59 are also used to insure transfer of current from the casting 43 to shaft 41. Thus in this instance (Figure 3) the sides of casting 43 have openings 67 to slidably accommodate the conducting blocks 68. The outer ends of these blocks are engaged by strips 69, which are loosely retained by screws 71, and which are urged by spring 72 in a direction to press the blocks 68 against the shaft 41. Thus current applied through conductors 63 to hub 61 is conducted by brush structures 59 to the hub 54 and shaft 42, and thence through casting 43, brush blocks 68, to the shaft 41, and then to the contact wheel 23.

Below each of the heads 12 there is a structure 76 which supports the ring and cover assembly during the soldering operation. This structure includes a bracket 77 which is attached to and part of the spider 19. A horizontal extension 78 of bracket 77 serves to carry operating parts including an annular metal platen 79, the upper surface of which is contoured in a particular manner to fit a particular ring and cover assembly, as will be presently explained. Platen 79 is raised and lowered at regular intervals during operation of the machine, and it is electrically connected by conductor 81 to the other terminal 82 of transformer 65. The particular arrangement illustrated for mounting platen 79, and for moving this platen as described, includes a vertically disposed plunger 83 which is slidably fitted within a vertical bore 84 in the bracket extension 78. Compression springs 86 yieldably urge this plunger downwardly. The upper end of plunger 83 is attached to a plate 87, which in turn cooperates with an overlying plate 88. The latter plate 88 is attached to the under side of platen 79, and it is retained against lateral displacement by an annular lip or flange 89. Compression springs 91 normally urge the plates 87 and 88 apart. A limiting screw 92 is attached at its upper end to plate 88, and extends loosely through an aperture in plate 87. This screw limits the maximum spacing between plates 87 and 88 to a predetermined amount, while permitting these plates to be forced together a certain amount against the urge of compression springs 91.

Structure 83 is provided with a screw 94, the head of which is engaged by roller 96 carried by one end of a rocker arm 97. This rocker arm is fulcrumed at 98 to the bracket 77, and its inner end is provided with a roller 99 (Figure 1). An annular cam 101 is formed upon the adjacent portion of the machine base 10 and has a cam surface 102 engaged by roller 99. Cam surface 102 is arranged to swing rocker arm 97 at predetermined intervals during rotation of the associated head 12, to position the associated platen 79 in a manner to be presently described.

The ring 24 carried by the lower end of the shell 22 cooperates with the platen 79 in gripping and retaining the ring and cover assembly during a soldering operation. This ring is likewise slidably retained within the annular lip 104, and is yieldably urged downwardly by compression springs 106.

Figure 4 illustrates a ring and cover assembly of the type with which this machine is adapted to operate. Both the cover and ring parts 107 and 108 are formed of pressed sheet metal, such as is ordinarily used in the manufacture of so-called tin containers. The outer periphery of the ring 108 has a turned edge 109, for crimping in accordance with methods known to those skilled in the art to form an end seam with side walls of a container. Concentric annular offsets 111 and 112 lend strength to the ring, and make it possible for the completed assembly to present a substantially planar outer surface. An annular portion of the ring 108 is doubled upon itself at 113 to form in effect an annular rib or shoulder 114. Inwardly of this shoulder the remaining metal of the ring forms an inturned collar 116.

The cover part 107 is formed to provide a nearly cylindrical portion 117, which is proportioned to frictionally fit within the collar 116. Also the cover has an outwardly extending flange 118, which is adapted to overlie the shoulder 114. Preferably flange 118 has an annular portion of its area struck up as at 119, in the region of the shoulder 114, and also its outer edge is preferably turned over as at 121 to lend strength.

Preliminary to utilization of the present machine and method, a small amount of solder is applied to the outer end of the shoulder 114, as indicated at 122, and the ring and its associated cover are assembled as shown in Figure 4, in preparation for a soldering operation to fuse the solder 122, and thus seal the cover with respect to the ring. Also it may be desirable to apply a suitable soldering flux.

It will be apparent from Figures 2 and 5 that the clamping rings 24, and also platen 79, are proportioned to engage the assembly shown in Figure 4. Thus the platen 79 is provided with a raised annular area 123, to receive the offset portion 112 of the ring 108, and also the platen is provided with an annular lip or ledge 124, to align the ring and to retain it against lateral displacement. The upper clamping ring 24 is also provided with an annular shoulder 126 adapted to engage the outer edge 121 of the cover 107. Thus when the rocker arm 97 is in a position to elevate the platen 79, the ring 24 and platen 79 are yieldably pressed against the cover and ring parts of the assembly, and so that these parts are urged together and are in proper position for a soldering operation. As shown in Figure 5, the contact wheel 23 establishes peripheral contact with the offset 119 of the cover 107, immediately above the areas to be soldered together.

Figure 6 illustrates a suitable electrical hookup for the machine. Each of the electrical transformers 65 is shown having their secondaries connected to a soldering head and to a platen 79, as previously described. Slip rings 131, 132 and 133 are connected to a suitable source of three phase alternating current, represented by the three phase alternating current generator 134. Each of the transformer primaries are connected to a selected pair of the slip rings, and each primary circuit includes suitable fuses 136, a voltage adjusting switch 137, and a controlling switch 138 for establishing or interrupting flow of current to the transformer.

Figure 1 shows the stationary slip rings 131, 132, and 133 carried by the base of the machine. Also suitable brush structures 141, 142 and 143 are shown for connecting the slip rings with the current supply lines 144. The control switches 138 are shown mounted upon small brackets 146, carried by the larger brackets 77. Each switch is shown provided with a movable operating arm 147, the outer end of which carries a cam roller 148. These rollers engage the upper cam surface 149, formed on cam 101, so that the contacts of switch 138 are closed for only a limited portion of the movement of an operating head.

Operation of the machine, and the carrying out of the present method, can now be completely reviewed as follows: When the machine is in operation the soldering head 12 rotates continuously about the axis of the central vertical shaft 13, and the contact wheels 23 also continuously rotate upon their individual axes, and about the axes of the vertical shafts 42. Suitable feed mechanism such as is known to those skilled in the art is used to transfer cover and ring assemblies (as shown in Figure 4) to the soldering heads, as the heads pass through a feed position. In this feed position the platen 79 of each head is dropped to its lowermost position, as shown in the left hand portion of Figure 1. When a cover and ring assembly is fed upon a platen, and as that particular head moves beyond the feed position, the associated arm 97 is rocked by cam action to raise the platen 79, and thus cause the cover and ring assembly to be gripped between the platen and the clamping ring 24 (see Figure 5). At the same time contact is established with the periphery of the contact wheel 23. The associated control switch 138 is now closed by movement of the associated cam roller 148 beyond the cam surface 149. A relatively heavy current is now applied from the contact wheel through the cover and ring assembly, with practically all of this current flow occurring through a localized region of the assembly immediately underlying the point of engagement with wheel 23. As a result of this heavy localized application of current the solder in this localized region is melted practically instantaneously, and as the wheel rolls along the offset 119, the melting occurs progressively. The solder chills and hardens immediately after passage of the contact wheel, due to rapid conduction of heat to the adjacent cooler portions of metal.

By the method described above only a minor portion of current passes through the metal surfaces in contact between collar 116 and the cylindrical portion 117 of the cover. This is because of the increased resistance caused by the length of the metal path for flow of current, and because of the relatively poor contact provided between the portions 116 and 117, whereby sufficient current does not flow between the surfaces to cause fusion at this point.

One revolution of the contact wheel about the shaft 42 is sufficient to completely solder the cover and the ring together. This operation can be carried out while the head is moving through an arc of say 240° about the shaft 13. Thereafter the platen 79 is again dropped to its lowermost position, and as the head passes through a discharge position, suitable means such as is known to those skilled in the art, can be provided for removing the soldered assembly. Both feeding and discharge operations can be carried out while the soldering head is passing through a minor arc of its complete movement, as for example an arc of 115°.

In practice satisfactory results have been secured where the velocity of rolling movement of the contact wheel 23 over the cover is at a speed of the order of 50 to 75 feet per minute, and with a current value of the order of 400 to 450 amperes. This is with the cover-ring assembly made from tin plated sheet metal having a thickness of the order of 0.011 inch, and with the width of the soldered seal between the cover and ring parts being of the order of four times or less the gauge of the metal.

My machine and method can also be applied for a cover-ring assembly of the type shown in Figs. 7 and 8. In this instance the ring part includes the outer turned edge 151, for making a double seam with the side walls of the container, an inner collar or downturned flange 152 for frictionally engaging the cover, and the intermediate inset portions 153 and 154. Portion 154 is interrupted by a portion 154a, which is struck upwardly to form an annular area for engagement with an adjacent part of the cover. Films or surface areas 156 and 157 of suitable non-conducting and solder repellent material, such as a lithographing lacquer, are applied upon the upper side of portion 154, these films being separated by the narrow circular strip 158 of exposed metal. The purpose of films 156 and 157 is to limit the width of the solder applied to strip 158, prior to assembling the ring part with the cover, and to limit the width of the solder seal formed in the final solder sealing operation. As disclosed in copending application Serial No. 497,641, filed of even date in the name of Leslie W. Hills (now Patent Number 2,416,693, dated March 4, 1947), the extent of the films may vary, and if desired film 157 can be extended downwardly over collar 152 and thus electrically insulate portions 152 and 161. The same result can be accomplished by applying lacquer to the outer peripheral surface of the cover portion 161. Preparatory to assembling the ring with a cover part, the narrow strip 158 is tinned with a ridge of solder, preferably by use of the machine and the method disclosed and claimed in my co-pending application Serial No. 497,646, filed of even date, and entitled "Electric solder-applying machine."

The cover part shown in Figure 7 consists of a cylindrical portion 161, to frictionally fit within the downturned flange or collar 152, a substantially flat portion 162 extending outwardly from cylindrical portion 161, and a raised annular flange 163 having an edge 164 which is turned over or otherwise reinforced.

Figure 9 illustrates how the cover-ring assembly can be handled by my machine, for a final solder sealing operation. Parts numbered 23a, 24a, and 79a, correspond to the parts numbered 23, 24, and 79, in Figures 2 and 9. Some modification with respect to proportions and form is required to accommodate this particular type of cover-ring assembly. Contact wheel 23 operates over the assembly in the same manner previously described, to secure substantially instantaneous fusion followed by solidification of the solder, as the wheel progresses over the assembly. After the solder sealing operation the cover is solder sealed to the ring along a substantially narrow line, which can be readily broken by prying the cover upwardly.

The completely soldered cover and ring assembly can be readily applied to containers for the packaging of various products, such as coffee, spices, paints and the like. Such a container after being filled can be vacuumized or subjected to heat sterilization. To remove the cover it is only necessary for the housewife to insert a common appliance such as a spoon, under the cover flange, and then by simple prying action the soldered seal can be broken, without mutilating the cover.

My machine and method is capable of relatively high capacity, and therefore it is well adapted to fit into existing can lines of packing establishments.

I claim:

1. In a machine of the character described for forming a soldered seal between the cover and ring parts of a container top assembly, where the parts are provided with opposed annular areas for soldering together with at least one of the areas having a narrow line of solder applied to the same, and where the cover part has a peripheral prying flange spaced from the adjacent portion of the ring part, a platen device adapted to support the assembly, a soldering head device adapted to overlie the platen in vertical axial alignment therewith, clamping means carried by one of said devices, said clamping means including a ring having a recess formed in its lower inner edge and adapted to engage and apply pressure to the peripheral flange of the cover part and to urge the same towards the platen to thereby press said annular areas into engagement, a contact wheel carried by the soldering head device, means for rotating the wheel about the vertical axis of the soldering head device, the wheel being rotatably mounted on an axis extending radially with respect to said vertical axis, the peripheral portion of the wheel being in engagement with a portion of the cover and ring assembly adjacent said annular areas, and means for connecting the platen and the contact wheel to a source of electric current, whereby current is caused to flow between the opposed annular areas to fuse the solder.

2. In a machine of the character described for forming a soldered seal between the cover and ring parts of a container top assembly, where the parts are provided with limited opposed annular areas for soldering together, and with at least one of the areas being tinned with solder, a platen adapted to support the assembly, a soldering head adapted to overlie the platen in vertical axial alignment therewith, means for moving the platen between clamping and disengaged positions with respect to the head, a clamping ring carried by the head whereby when the platen is in its clamping position, the cover and the ring assembly is clamped between the platen and the ring, a contact wheel carried by the head, means for rotating the wheel about the vertical axis of the head, the wheel being rotatably mounted on an axis extending radially from said vertical axis, the peripheral portion of the wheel being in engagement with a portion of a cover and ring assembly clamped by the platen, and means for connecting the platen and the contact wheel to a source of electric current, whereby current is caused to flow between the opposed annular areas to fuse the solder.

3. In a machine of the character described for forming a soldered seal between the cover and ring parts of a container top assembly, where the parts are provided with limited opposed annular areas for soldering together, with at least one of the areas being tinned with solder, a plurality of soldering heads, means for mounting said heads for rotation about a vertical axis, a movable platen disposed below each soldering head, each platen being adapted to receive a cover and ring assembly, means for moving each platen between clamping and released positions, as the associated soldering head rotates, a clamping ring associated with the lower end of each soldering head and adapted to cooperate with its associated platen for the clamping of a cover ring assembly, a vertical shaft disposed in each soldering head, means for rotating each shaft, a laterally extending shaft carried at the lower end of each vertical shaft, means drivingly interconnecting each vertical shaft with the laterally extending shaft at its lower end, a contact wheel mounted upon one end of the laterally extending shaft, the periphery of the contact wheel being adapted to engage an annular portion of the assembly immediately overlying said annular areas, and means for connecting the platen and the contact wheel to a source of current.

4. In a machine of the character described for forming a soldered seal between the cover and ring parts of a container top assembly, where the parts are provided with opposed annular areas for soldering together, with at least one of the areas being tinned with solder, and where the cover part has a peripheral prying flange spaced from the adjacent portion of the ring part, a platen device adapted to support the assembly, a soldering head device adapted to overlie the platen in vertical axial alignment therewith, means for moving one of said devices between clamping and disengaged positions with respect to the other device, a clamping means carried by the head whereby when the head and platen devices are in clamping position, pressure is applied to the peripheral flange of the cover part whereby the cover and ring assembly is clamped between the platen and the clamping means with said annular areas pressed into engagement, a contact wheel carried by the head, means for rotating the wheel about the vertical axis of the head, the wheel being rotatably mounted on an axis extending radially from said vertical axis, the peripheral portion of the wheel being in engagement with a portion of the cover and ring assembly adjacent said areas, and means for connecting the platen and the contact wheel to a source of electric current, whereby current is caused to flow between the opposed annular areas to fuse the solder.

5. In a machine of the character described for forming a solder seal between the cover and ring parts of a container top assembly, where said parts are provided with confronting annular areas adapted to be soldered together with at least one of said areas having a narrow line of solder applied to the same, and where the cover part has a peripheral prying flange spaced from the underlying portion of the ring part: a metallic platen device adapted to support the container top assembly, a soldering head device adapted to overlie said platen device in vertical axial alignment therewith, means for moving one of said devices toward and away from the other, clamping means carried by said soldering head device and including a yieldably mounted member adapted to engage the peripheral prying flange of said cover part and to urge the same toward said platen device to thereby press said annular areas of said ring and cover parts into engagement when said one device has been moved toward the other, a metallic contact wheel carried by said soldering head device, means for moving said contact wheel about the vertical axis of said soldering head device, said contact wheel being rotatably mounted about an axis extending radially with respect to said vertical axis, the peripheral portion of said contact wheel being adapted to engage with a portion of said cover adjacent said annular areas, and means for connecting said platen device and said contact wheel to a source of electrical current, whereby current is caused to flow through the opposed annular areas of the container top assembly to fuse the solder therebetween and thus form a seal between said cover and ring parts.

6. In a machine of the character described for forming a solder seal between the cover and ring parts of a container top assembly, where said parts are provided with confronting annular areas adapted to be soldered together with at least one of said areas having a narrow line of solder applied to the same, and where the cover part has a peripheral prying flange spaced from the underlying portion of the ring part: a metallic platen device including a yieldably mounted member adapted to support the container top assembly, a soldering head device adapted to overlie said platen device in vertical axial alignment therewith, means for moving one of said devices toward and away from the other, clamping means carried by said soldering head device and including a yieldably mounted member adapted to engage the peripheral prying flange of said cover part and to urge the same toward said yieldably mounted member of said platen device to thereby press said annular areas of said ring and cover parts into engagement when said one device has been moved toward the other, a metallic contact wheel carried by said soldering head device, means for moving said contact wheel about the vertical axis of said soldering head device, said contact wheel being rotatably mounted about an axis extending radially with respect to said vertical axis, the peripheral portion of said contact wheel being adapted to engage with a portion of said cover and ring assembly adjacent said annular areas, and means for connecting said platen device and said contact wheel to a source of electrical current, whereby current is caused to flow through the opposed annular areas of the container top assembly to fuse the solder therebetween and thus form a seal between said cover and ring parts.

HARRY A. MULVANY.

REFERENCES CITED

The following references are of record in the file of this patent:

UNITED STATES PATENTS

| Number | Name | Date |
| --- | --- | --- |
| 1,141,517 | Andrews | June 1, 1915 |
| 1,550,651 | Charter | Aug. 18, 1925 |
| 2,160,405 | Mallalieu | May 30, 1939 |
| 1,172,302 | Murray | Feb. 22, 1916 |
| 1,601,927 | Tobey | Oct. 5, 1926 |

OTHER REFERENCES

Welding Handbook, 1942 edition, American Welding Society, 33 W. Thirty-ninth St., New York, N. Y., pages 392 and 395.